July 10, 1923.
E. R. LINEBAUGH
PAPER CUTTING MACHINE
Filed June 15, 1921
1,461,425
2 Sheets-Sheet 1
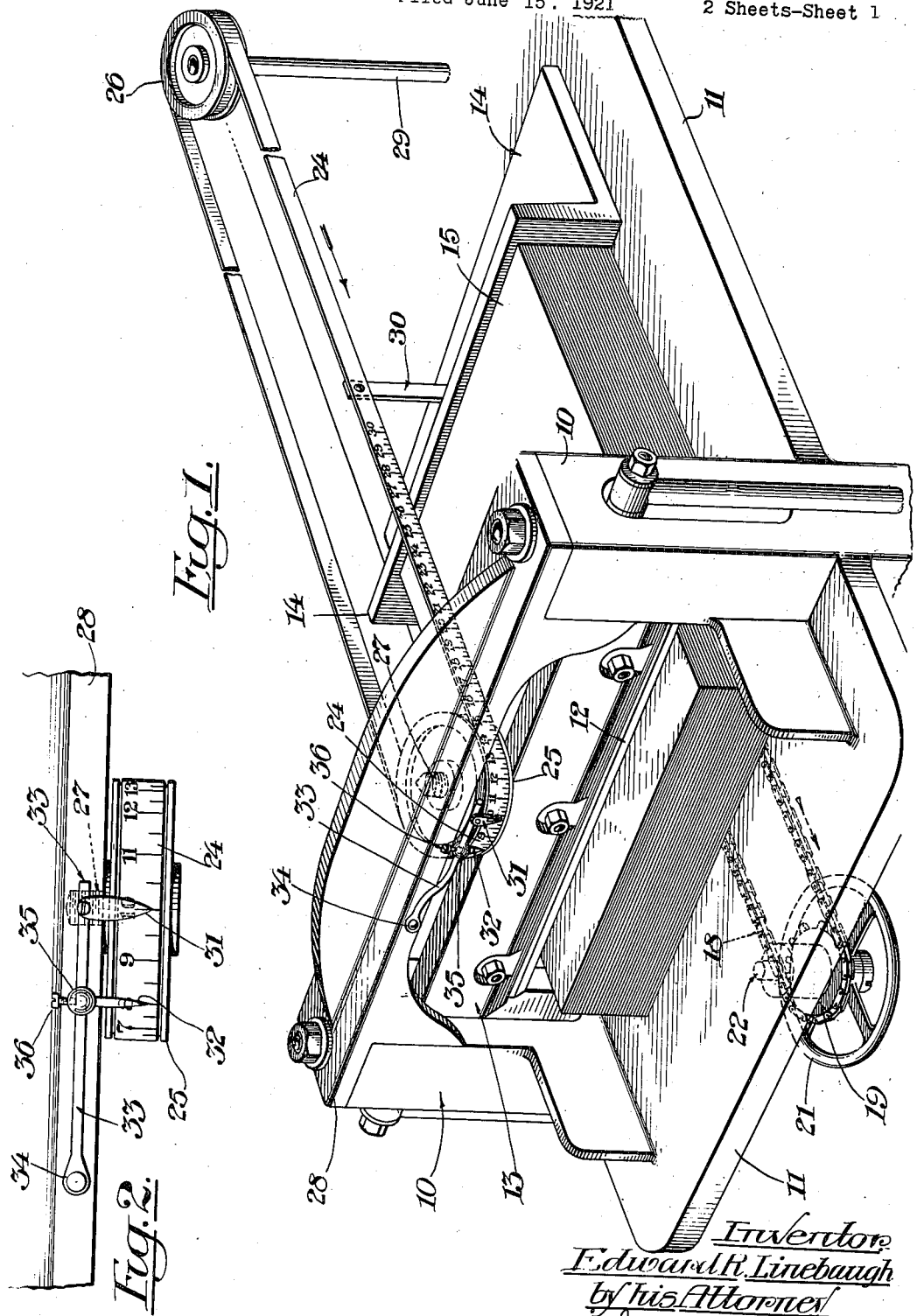
Inventor
Edward R. Linebaugh
by his Attorney
John T. Nolan

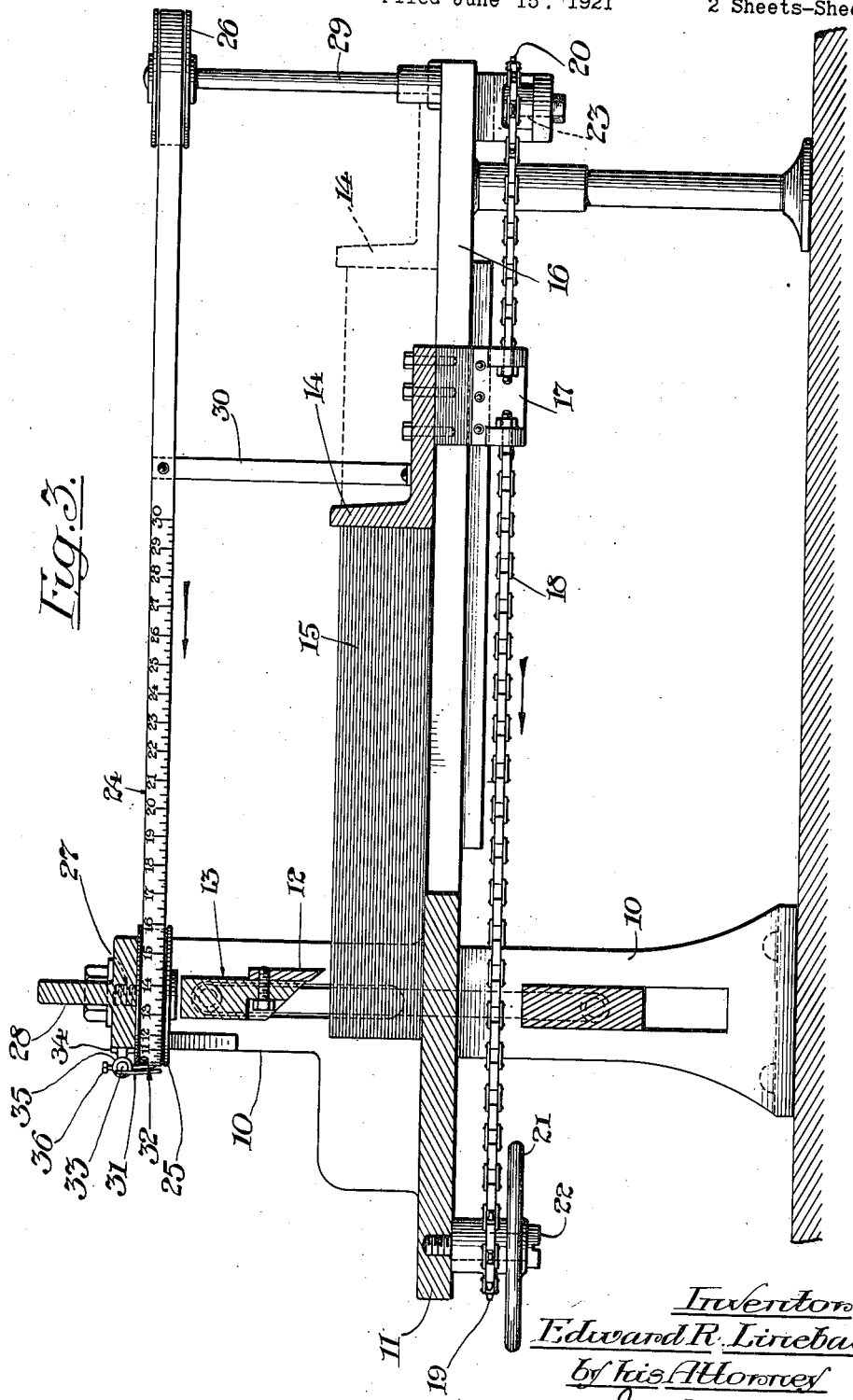

Patented July 10, 1923.

UNITED STATES PATENT OFFICE.

1,461,425

EDWARD R. LINEBAUGH, OF BARBERTON, OHIO, ASSIGNOR TO THE DIAMOND MATCH COMPANY, OF CHICAGO, ILLINOIS, A CORPORATION OF ILLINOIS.

PAPER-CUTTING MACHINE.

Application filed June 15, 1921. Serial No. 477,618.

*To all whom it may concern:*

Be it known that I, EDWARD R. LINEBAUGH, a citizen of the United States, and resident of Barberton, in the county of Summit and State of Ohio, have invented certain new and useful Improvements in Paper-Cutting Machines, of which the following is a specification.

This invention relates to paper-cutting machines, and especially to the mechanism employed therein for adjusting the back gage for the paper-stock on the table of the machine. Such mechanism comprises a graduated steel measuring tape passing about pulleys at the rear and front of the table, and being connected with and operated by the gage actuating devices in such a manner as to indicate to the operator the various positions of adjustment of the gage in respect to the cutting path of the knife. Heretofore a single index finger for the tape has been employed, and in consequence it has been necessary for the operator to calculate each successive forward adjustment of the gage and then refer to the measuring tape. Where the adjustments are in whole numbers, as for example, two inches, it is an easy matter to read the successive adjustments on the tape; but where the adjustments are fractional, as for example, two inches and three-sixteenths of an inch, it requires careful calculation and observation on the part of the operator in order to secure succeeding accurate adjustments.

The object of my invention is to provide simple and efficient means whereby each succeeding adjustment of the gage can be accurately determined without recourse to involved mental effort; and to that end, the invention comprises a supplemental index member so constructed and arranged that it can be readily and accurately set to any predetermined distance, within limits, from the main index member, and by which supplemental member and in accordance with its spaced relation to the main member, as indicated by the graduations of the measuring tape, each succeeding adjustment of the gage can be accurately accomplished with facility, as will be hereinafter described and claimed.

In the drawings—

Figure 1 is a perspective view of a portion of a paper-cutting machine embodying my invention, only so much of the machine being shown as is necessary to illustrate the improvement.

Fig. 2 is a front elevation of the measuring tape, and adjuncts, showing the spaced index members and their support.

Fig. 3 is a partial longitudinal vertical section of the machine.

Referring to the drawings, 10 designates the frame, 11 the table; 12 the cutting knife, and 13 the vertically reciprocative cross-head for the knife.

A back gage 14 extends across the table, and is adapted to be actuated to feed the pile of paper-stock 15 along the table and toward the knife. Depending from the gage and through a longitudinal slot 16 in the table, is a coupling member 17 to which are connected the ends of a chain 18 which passes about sprocket-wheels 19, 20 beneath the front and rear ends, respectively, of the table. The front sprocket-wheel is formed on or secured to the hub of a hand wheel 21 which is rotatably mounted on a stud 22 depending from the table, the rear sprocket wheel being similarly mounted on a stud 23 depending from the table. By manually rotating the hand wheel the chain can be impelled in a manner to move the gage forwardly or rearwardly along the table, as desired; its forward movement effecting the advancement of the paper-stock in respect to the cutting plane of the knife.

A graduated measuring tape 24 passes around two pulleys 25, 26 arranged above the front and rear respectively of the table. The front pulley is mounted to turn on a stud 27 depending from the overhanging cross-bar 28 of the main frame, and the rear pulley is mounted to turn on the upper end of a shaft 29 rising from a bracket on the table. A rod 30 connects the back gage with one of the longitudinal runs of the tape, so that when the gage is moved back or forth a corresponding motion is transmitted to the measuring tape through the rod, and such tape, in conjunction with two spaced index fingers, adjacent thereto, indicates the extent of movement of the gage toward the knife, and, perforce, the width of the material to be severed from the forward end of the paper-stock.

Heretofore a single fixed index finger, as 31, has been employed and hence it has been necessary for the operator to calculate each successive adjustment of the gage and then refer to the measuring tape in order to determine the forward adjustment of the gage. In pursuance of my invention, I provide a supplemental index finger 32 which is adjustable laterally in respect to the fixed finger in such a manner as to indicate on the graduations of the measuring tape the distance between the two fingers. In the present instance, these fingers are mounted on a rod 33 which is attached at one end, as at 34, to the forward side of the crossbar 28, directly above the front flexure of the tape. The finger 32 is provided with a perforated head 35 which is slid on the rod and is held thereon by a setscrew 36 so as to have capacity for adjustment longitudinally of the rod.

The operation is as follows: At the outset the index finger 32 is spaced from the fixed finger a distance equal to the predetermined width of the material to be successively cut from the forward end of the paper-stock; such distance being accurately indicated by the graduations on the forward portion of the measuring tape. Assuming the gage 14 to be in contact with the rear of the stock and the front end of such stock to be in vertical alinement with the knife (by, for example, a preliminary trimming operation) the operator observes the graduation on the tape to which the fixed index finger points. He then turns the hand-wheel to advance the back gage and therewith the paper-stock and the measuring tape. When the observed graduation registers with the supplemental index finger the stock has been advanced the requisite distance, whereupon the cutting knife is actuated in the usual manner to sever the prescribed width of material from the stock. The operator then proceeds as before, and so on until the stock is exhausted.

From the foregoing it will be seen that no involved mental calculations are required on the part of the operator where fractional adjustments as to width obtain. Having once adjusted the supplemental index finger in proper spaced relation to the fixed finger, in accordance with the width to be severed from the stock, it is merely incumbent on him to observe the measurements indicated on the scale for the successive adjustments, as previously mentioned.

I do not limit my invention to the exact details of construction herein disclosed as the same may be modified within the principle of the invention and the scope of the appended claims.

I claim—

1. In a paper cutting machine having a knife, an adjustable back gage, means for adjusting said gage in relation to the knife, and a graduated measuring tape movable concurrently with said gage, two index members supported independently of and arranged in close relation to the tape so as to overlie the advancing graduations of the tape, and means whereby adjustment of said members in spaced parallel relation to each other can be effected.

2. In a paper cutting machine having a knife, an adjustable back gage, means for adjusting said gage in relation to the knife, and a graduated measuring tape movable concurrently with the gage, two index fingers supported independently of and arranged in close relation to the forward path of the tape so as to overlie the advancing graduations of the tape, one of said fingers being fixed and the other finger being adjustable toward and from the fixed finger and in parallel relation thereto.

3. In a paper cutting machine having a knife, an adjustable back gage, means for adjusting said gage in relation to the knife, and a graduated measuring tape movable concurrently with the gage, a stationary horizontal rod adjacent the forward path of the tape, an index finger fixed to said rod, and a supplemental index finger mounted on and adjustable longitudinally of said rod.

Signed at Barberton, in the county of Summit and State of Ohio, this 10th day of June, A. D. 1921.

EDWARD R. LINEBAUGH.